United States Patent
Ahn et al.

(10) Patent No.: US 8,741,469 B2
(45) Date of Patent: Jun. 3, 2014

(54) ELECTRODE ASSEMBLY WITH MULTIPLE SEPARATORS WOUND ABOUT A WINDING CENTER

(75) Inventors: Changbeom Ahn, Yongin-si (KR); Jeongsoon Shin, Yongin-si (KR); Youngbae Sohn, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 388 days.

(21) Appl. No.: 12/884,020

(22) Filed: Sep. 16, 2010

(65) Prior Publication Data
US 2011/0091762 A1   Apr. 21, 2011

(30) Foreign Application Priority Data
Oct. 15, 2009   (KR) .................. 10-2009-0098084

(51) Int. Cl.
*H01M 2/14*   (2006.01)

(52) U.S. Cl.
USPC ............ 429/131; 429/152; 429/247; 429/129

(58) Field of Classification Search
USPC ................................. 429/131, 152, 247, 129
See application file for complete search history.

(56) References Cited

U.S. PATENT DOCUMENTS

| | | | |
|---|---|---|---|
| 6,423,449 B1 * | 7/2002 | Hong | 429/231.95 |
| 7,132,194 B2 * | 11/2006 | Mizutani | 429/94 |
| 2002/0160258 A1 | 10/2002 | Lee et al. | |
| 2007/0184350 A1 * | 8/2007 | Kim et al. | 429/247 |
| 2011/0052964 A1 | 3/2011 | Kim et al. | |

FOREIGN PATENT DOCUMENTS

| | | | |
|---|---|---|---|
| CN | 1316787 A | 10/2001 | |
| CN | 1363122 A | 8/2002 | |
| EP | 0723304 A2 | 7/1996 | |
| JP | 2001-160393 A | 6/2001 | |
| JP | 2001155775 A * | 6/2001 | ............ H01M 10/40 |
| JP | 2002-184381 A | 6/2002 | |
| JP | 2011-507184 A | 3/2011 | |
| KR | 10-2004-0092105 A | 11/2004 | |
| KR | 2008-0036250 A | 4/2008 | |
| KR | 10-2008-0095967 A | 10/2008 | |
| WO | 01/59868 A1 | 8/2001 | |
| WO | 2004/097971 A1 | 11/2004 | |
| WO | 2005/043667 A1 | 5/2005 | |

OTHER PUBLICATIONS

European Search Report dated Feb. 18, 2011 issued by the EPO for corresponding Korean Patent Application No. 10-2009-0098084—4 pages.
Notice of Allowance dated Aug. 31, 2011 of corresponding Korean Patent Application No. 10-2009-0098084—5 pages.
Office Action dated Sep. 4, 2012 of corresponding Japanese Patent Application No. 2010-170520—1 page.
Chinese Office Action dated Feb. 27, 2013 of corresponding Chinese Patent Application No. 201010292679.8—6 pages.

* cited by examiner

*Primary Examiner* — Zachary Best
(74) *Attorney, Agent, or Firm* — Knobbe Martens Olson & Bear LLP (57) ABSTRACT

An electrode assembly for a secondary battery, a method of manufacturing the electrode assembly and a secondary battery having the electrode assembly. The electrode assembly includes a plurality of electrode members arranged in a stacked shape along a baseline extending in one direction and a separation unit separating two adjacent electrode members. The separation unit includes three or more separators having a same winding center.

20 Claims, 6 Drawing Sheets

ELECTRODE ASSEMBLY WITH MULTIPLE SEPARATORS WOUND ABOUT A WINDING CENTER

CROSS-REFERENCE TO RELATED APPLICATION

This application claims the benefit of Korean Patent Application No. 10-2009-0098084, filed on Oct. 15, 2009, the disclosure of which is incorporated herein by reference.

BACKGROUND

1. Field

Embodiments relate to a secondary battery, and more particularly, to an electrode assembly for a secondary battery, a method of manufacturing the same and a secondary battery with the same.

2. Description of the Related Art

Generally, an electrode assembly together with electrolyte is placed inside a case to form a secondary battery. The electrode assembly includes a positive electrode plate, a negative electrode plate, and a separator disposed between the positive and negative electrode plates.

In high capacity secondary batteries, a jelly-roll type electrode assembly including a plurality of electrode members and separators may be used. In the jelly-roll type electrode assembly, when the number of windings increases, it is difficult to precisely align the electrode members with the separator that is placed therebetween.

SUMMARY

Embodiments are directed to an electrode assembly for secondary battery, a method of manufacturing the electrode assembly and a secondary battery with the electrode assembly, which substantially overcomes one or more of the problems due to the limitations and disadvantages of the related art.

It is therefore a feature of an embodiment to provide an electrode assembly having a structure in which the winding number may be reduced, a method of manufacturing the same and a secondary battery with the same.

It is therefore a feature of another embodiment to provide an electrode assembly having a structure in which all of the electrode members are precisely aligned with each other, a method of manufacturing the same and a secondary battery with the same.

At least one of the above and other features and advantages may be realized by providing an electrode assembly for a secondary battery, including: a plurality of electrode members arranged in a stacked shape along a baseline extending in one direction; and a separation unit separating two adjacent electrode members of the plurality of electrode members from each other, wherein the separation unit includes three or more separators having the same winding center.

According to another aspect of the embodiments, the separation unit may include first, second, third, and fourth separators sequentially disposed along the baseline at a winding center portion. Each of ends of the four separators may be disposed at the winding center portion. The ends of the first and second separators and the ends of the third and fourth separators may be disposed opposite to each other with the baseline therebetween at the winding center portion. The rest of the electrode members except the electrode members disposed between the second separator and the third separator of the plurality of electrode members at the winding center portion may be attached to both surfaces of the first separator and both surfaces of the fourth separator.

According to another aspect of the embodiments, the second separator and the third separator may be closely attached to each other at the winding center portion.

According to another aspect of the embodiments, the separation unit may include first, second, and third separators sequentially disposed along the baseline at a winding center portion. An end of the first separator and an end of the third separator may be disposed opposite to each other with the baseline therebetween at the winding center portion, and the third separator may be wound to surround the end of the first separator and an end of the second separator at the winding center portion.

According to another aspect of the embodiments, each of centers of the plurality of electrode members may be disposed on the baseline.

According to another aspect of the embodiments, the plurality of electrode members may include a positive electrode member having both surfaces with a positive pole and a negative electrode member having both surfaces with a negative pole. The positive electrode member may include one positive plate. The negative electrode member may include one negative plate.

According to another aspect of the embodiments, in the electrode member, electrode plates having polarities different from each other may be alternately stacked with the separator therebetween, and both surfaces of the electrode member may have polarities different from each other.

At least one of the above and other features and advantages may be realized by providing a secondary battery, including: an electrode assembly including the above-described constitutions; and an exterior case receiving the electrode assembly.

At least one of the above and other features and advantages may be realized by providing a method of manufacturing an electrode assembly for a secondary battery, the method including: sequentially stacking ends of first, second, third, and fourth separators; rotating the ends of the first, second, third, and fourth separators to wind the separators; and providing a plurality of electrode members to both surfaces of the first separator and both surfaces of the fourth separator, wherein the ends of the first and second separators and the ends of the third and fourth separators are disposed opposite to each other with a winding center therebetween.

According to an aspect of the embodiments, the providing of the plurality of electrode members may include positioning electrode plates having the same polarity on the same surface of the first separator and the fourth separator and further positioning an electrode on an end portion of the second separator or an end portion of the third separator.

According to another aspect of the embodiments, the providing of the plurality of electrode members may include alternately positioning electrode plates having polarities different from each other on the same surface of the first separator and the fourth separator.

According to another aspect of the embodiments, the plurality of electrode members may be provided in the winding of the separators.

According to another aspect of the embodiments, the plurality of electrode members may be attached to the first separator and the fourth separator using a laminating process.

At least one of the above and other features and advantages may be realized by providing a method of manufacturing an electrode assembly for a secondary battery, the method including: sequentially stacking ends of first, second, and third separators; rotating the ends of the first and third separators and a middle portion of the second separator to wind the separators; and providing a plurality of electrode members to both surfaces of the first separator and both surfaces of the third separator, wherein the end of the first separator and the end of the third separator are disposed opposite to each other with a winding center therebetween.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 1:
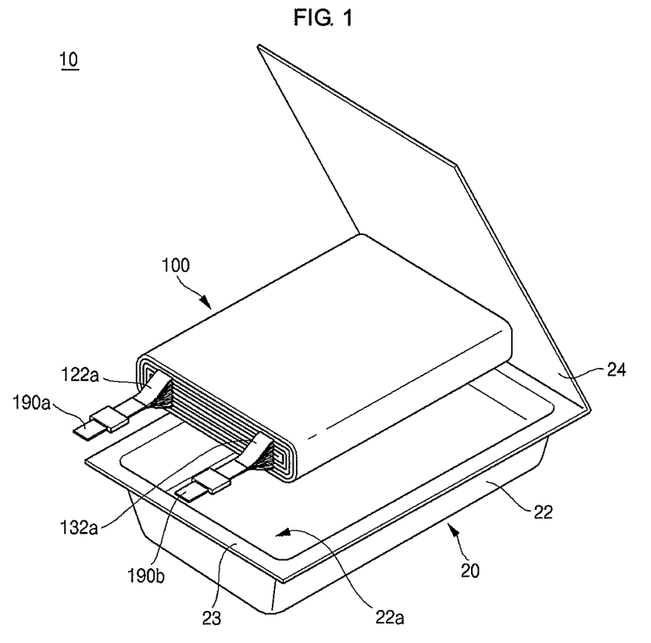
FIG. 1 illustrates a perspective view of a secondary battery according to an embodiment.

A winding structure and a winding method of an electrode assembly 100 of a secondary battery 10 according to an embodiment will be described. FIG. 1 illustrates a perspective view of the secondary battery 10 according to an embodiment. Referring to FIG. 1, the secondary battery 10 includes an exterior case 20 and the electrode assembly 100 placed into the exterior case 20.

The exterior case 20 has a pouch-type structure and includes a body 22 and a cover 24. The body 22 includes a receiving part 22a and a sealing part 23. The receiving part 22a provides a space in which an electrode assembly 100 is received. The sealing part 23 outwardly extends from an inlet of the receiving part 22a. The cover 24 is integrated with an edge of the sealing part 23. The electrode assembly 100 is placed in the receiving part 22a of the body 22, and then, the sealing part 23 is thermally fused to the cover 24 so that the body 22 is closely attached to the cover 24.

Figure 2:
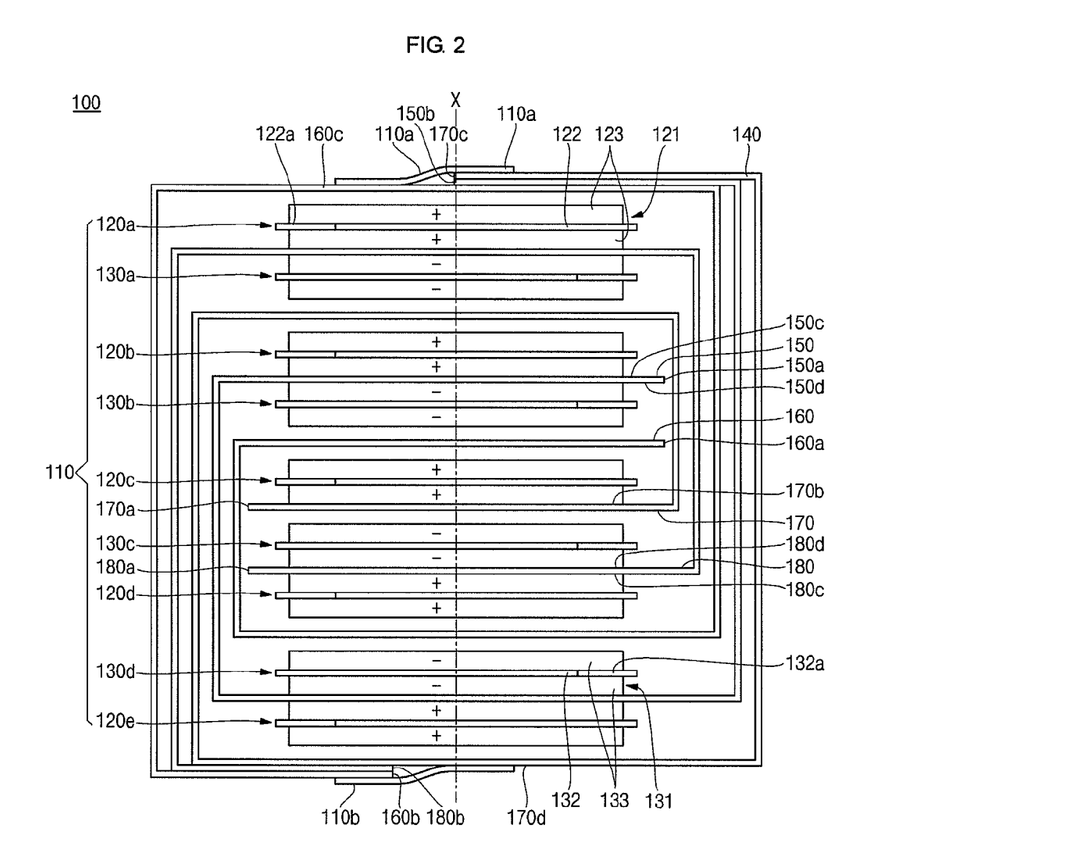
FIG. 2 illustrates an electrode assembly of FIG. 1.

FIG. 2 illustrates a diagram of the electrode assembly 100 of FIG. 1 according to an embodiment. Referring to FIGS. 1 and 2, the electrode assembly 100 includes a plurality of electrode members 110 and an electrode member separation unit 140.

The plurality of electrode members 110 are arranged along an arrangement baseline X in a stacked shape. Two electrode members 110 adjacent to each other are separated from each other by the electrode member separation unit 140. The plurality of electrode members 110 is arranged such that positive electrode members 120a, 120b, 120c, 120d, and 120e and negative electrode members 130a, 130b, 130c, and 130d are alternately positioned along the arrangement baseline X. Centers of the plurality of electrode members 110 are aligned on the arrangement baseline X.

Each of the positive electrode members 120a, 120b, 120c, 120d, and 120e includes one positive electrode plate 121. The positive electrode plate 121 includes a positive electrode collector 122 and a positive electrode active material 123 coated on both surfaces of the positive electrode collector 122. The positive electrode collector 122 includes a conductive metal plate formed of a material such as aluminum. An outwardly protruding positive electrode tab 122a on which the positive electrode active material is not coated is disposed in the positive electrode collector 122. The positive electrode tab 122a of the positive electrode plate 121 is fused onto a positive electrode terminal 190a, illustrated in FIG. 1, extending outwardly of the pouch-type case 20 using a method such as supersonic welding or resistance welding. The positive electrode active material 123 includes a layered compound containing lithium, a conductive material for improving conductivity, and a binder for improving a coupling force between the layered compound and the conductive material.

Each of the negative electrode members 130a, 130b, 130c, and 130d includes one negative electrode plate 131. The negative electrode plate 131 includes a negative electrode collector 132 and a negative electrode active material 133 coated on both surfaces of the negative electrode collector 132. The negative electrode collector 132 includes a conductive metal plate formed of a material such as copper. An outwardly protruding negative electrode tab 132a on which the negative electrode active material is not coated is disposed in the negative electrode collector 132. The negative electrode tab 132a of the negative electrode plate 131 is fused onto a negative electrode terminal 190b, illustrated in FIG. 1, extending outwardly of the pouch-type case 20 using a method such as supersonic welding or resistance welding. The negative electrode active material 133 includes a carbon such as graphite containing carbon and a binder for improving a coupling force between carbon particles. Also, the negative electrode active material 133 may include tin oxide (SnO) or lithium titanium oxide (LTO). When graphite is used as the negative electrode active material, the positive electrode plate 121 may have an area less than that of the negative electrode plate 131. Also, when SnO or LTO is used as the negative electrode active material, the positive electrode plate 121 may have an area greater than that of the negative electrode plate 131.

Referring to FIG. 2, the electrode member separation unit 140 includes a first separator 150, a second separator 160, a third separator 170, and a fourth separator 180, which have the same winding center. The first separator 150, the second separator 160, the third separator 170, and the fourth separator 180 are sequentially stacked along the arrangement baseline X in a winding center portion. Fine pores are formed in each of the separators 150, 160, 170, and 180. Lithium ions moving between the electrode members 110 pass through the fine pores. Each of the separators 150, 160, 170, and 180 may be formed of a polymer resin such as polyethylene (PE) or polypropylene (PP).

The first separator 150 is wound in one direction (in a counterclockwise direction from a center portion when viewed from FIG. 2) from the winding center portion of the electrode assembly 100 toward the outside of the winding center portion of the electrode assembly 100. An inner end 150a of the first separator 150 is disposed at the winding center portion. The plurality of electrode members 120b, 130b, 120e, and 130d are attached to both surfaces of the wound first separator 150. The positive electrode members 120b and 120e are attached to an outer surface 150c of the first separator 150. The negative electrode members 130b and 130d are attached to an inner surface 150d of the first separator 150.

The second separator 160 is also wound in one direction (in the counterclockwise direction from the center portion when viewed from FIG. 2), from the winding center portion of the electrode assembly 100 toward the outside of the winding center portion of the electrode assembly 100. An inner end 160a of the second separator 160 is disposed at the winding center portion. An outer end 150b of the first separator 150 and an outer end 170c of the third separator 170 are fixed to an outer surface 160c of the separator 160 using a first adhesive tape 110a.

The third separator 170 is wound in one direction (in the counterclockwise direction from the center portion when viewed from FIG. 2) from the winding center portion of the electrode assembly 100 toward the outside of the winding center portion of the electrode assembly 100. An inner end 170a of the third separator 170 is disposed at the winding center portion. The electrode member 120c is attached to an inner surface 170b of the third separator 170 facing the second separator 160 at the winding center portion. An outer end 160b of the second separator 160 and an outer end 180b of the fourth separator 180 are fixed to an outer surface of the third separator 170d using a second adhesive tape 110b.

The fourth separator 180 is wound in one direction (in the counterclockwise direction from the center portion when viewed from FIG. 2) from the winding center portion of the electrode assembly 100 toward the outside of the winding center portion of the electrode assembly 100. An inner end 180a of the fourth separator 180 is disposed at the winding center portion. The plurality of electrode members 120a, 130a, 120c, and 130d are attached to both surfaces of the wound fourth separator 180. The positive electrode members 120a and 120d are attached to an outer surface 180c of the fourth separator 180. The negative electrode members 130a and 130c are attached to an inner surface 180d of the fourth separator 180.

The inner ends 150a and 160a of the first and second separators 150 and 160 and the inner ends 170a and 180a of the third and fourth separators 170 and 180 are disposed opposite to each other with respect to the arrangement baseline X of the plurality of electrode members 110.

Figure 3:
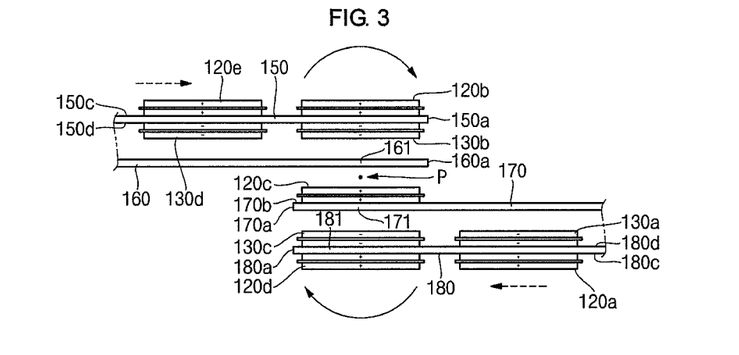
FIG. 3 illustrates a process of manufacturing the electrode assembly of FIG. 2.

FIG. 3 illustrates a view of a process of manufacturing the electrode assembly 100 of FIG. 2. Referring to FIG. 3, an end portion 151 of the first separator 150, an end portion 161 of the second separator 160, an end portion 171 of the third separator 170, and an end portion 181 of the fourth separator 180 are sequentially stacked with respect to a winding center P. The ends 150a and 160a of the first and second separators 150 and 160 and the ends 170a and 180a of the third and fourth separators 170 and 180 are disposed opposite to each other with respect to the winding center P. The first separator 150, the second separator 160, the third separator 170, and the fourth separator 180 are disposed toward the winding center P to perform a winding process. The first separator 150 and the second separator 160 are disposed in a direction of the winding center P, and the third separator 170 and the fourth separator 180 are disposed in a direction opposite to the direction of the winding center P.

The first separator 150 and the second separator 160 are moved from a left side of FIG. 3 toward the winding center P, i.e., a right side. An outer surface of the first separator 150 becomes an internal surface when the first separator 150 is wound and an inner surface 150d of the first separator 150 becomes an outer surface 150c when the first separator 150 is wound. The plurality of positive electrode members 120b and 120e are sequentially disposed on the outer surface 150c of the first separator 150 in a direction away from the winding center P. The plurality of positive electrode members 120b and 120e may be attached to the first separator 150 using a laminating process. The plurality of negative electrode members 130b and 130d are sequentially disposed corresponding to the plurality of positive electrode members 120b and 120e on the inner surface 150d of the first separator 150 in a direction away from the winding center P. The plurality of negative electrode members 130b and 130d may be attached to the first separator 150 using a laminating process. As shown in FIG. 2, the plurality of electrode members 120b, 120e, 130b, and 130d may be attached to the first separator 150 during the winding process, and thus, aligned on the arrangement baseline X. For this, a distance between the plurality of positive electrode members 120b and 120e and a distance between the plurality of negative electrode members 130b and 130d gradually increases from the arrangement baseline X.

The third separator 170 and the fourth separator 180 are moved from a right side of FIG. 3 toward the winding center P, i.e., a left side. The third separator 170 has an inner surface 170b that is an internal surface when the third separator 170 is wound. One positive electrode member 120c is attached to a position closest to the inner end 170a on the inner surface 170b of the third separator 170.

The fourth separator 180 has the outer surface 180c, that becomes an external surface when the fourth separator 180 is wound, and an inner surface 180d that is an internal surface and a surface opposite to the outer surface 180c. The plurality of positive electrode members 120d and 120a are sequentially disposed on the outer surface 180c of the fourth separator 180 in a direction away from the winding center P. The plurality of positive electrode members 120a and 120d may be attached to the fourth separator 180 using a laminating process. The plurality of negative electrode members 130c and 130a are sequentially disposed corresponding to the plurality of positive electrode members 120d and 120a on the inner surface 180d of the fourth separator 180 in a direction away from the winding center P. The plurality of negative electrode members 130c and 130a may be attached to the fourth separator 180 using a laminating process. As shown in FIG. 2, the plurality of electrode members 120a, 120d, 130a, and 130c may be attached to the fourth separator 180 during the winding process, and thus, aligned on the arrangement baseline X. For this, a distance between the plurality of positive electrode members 120a and 120d and a distance between the plurality of negative electrode members 130a and 130c gradually increases from the arrangement baseline X.

Since the plurality of electrode members 120e, 120b, 120d, 120a, 130a, 130b, 130c, and 130d are disposed on both surfaces of the first separator 150 and the fourth separator 180, the winding number may be reduced when the electrode members are disposed on one surface of the separators.

Figure 4A:
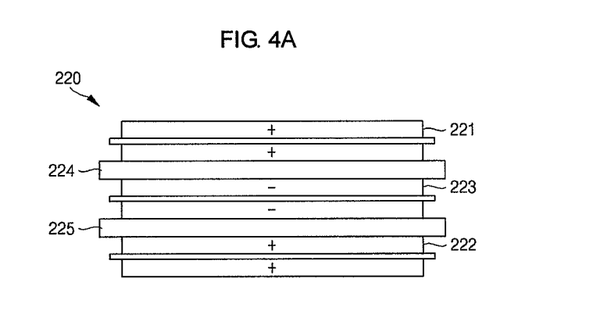
FIGS. 4A and 4B illustrate a positive electrode member and a negative electrode member of an electrode assembly of a secondary battery according to another embodiment.
Figure 4B:
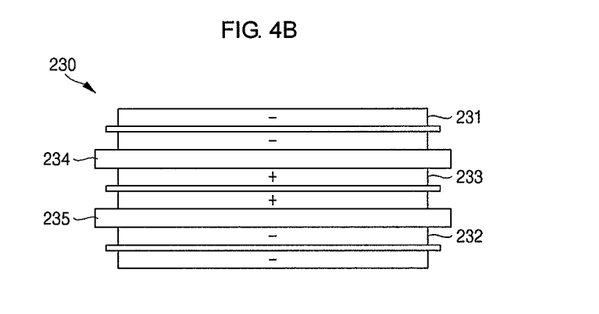

FIGS. 4A and 4B illustrate diagrams of a positive electrode member 220 and a negative electrode member 230 of an electrode assembly of a secondary battery according to another embodiment. Since this embodiment has the same winding structure and winding method as the previously described embodiment, their detailed descriptions will be omitted.

Referring to FIG. 4A, the positive electrode member 220 includes two positive electrode plates 221 and 222, one negative electrode plate 223 disposed between the two positive electrode plates 221 and 222, and two separators 224 and 225 respectively inserted into the negative electrode plate 223 and the two positive electrode plates 221 and 222. Since the positive electrode plates 221 and 222 have the same configuration as the positive electrode plate 121 of FIG. 2, and the negative electrode plate 223 has the same configuration as the negative electrode plate 131 of FIG. 2, their detailed descriptions will be omitted. Fine pores are formed in each of the two separators 224 and 225. Lithium ions moving between the electrode plates 221, 222, and 223 pass through the fine pores. Each of the separators 224 and 225 may be formed of a polymer resin such as PE or PP.

Referring to FIG. 4B, the negative electrode member 230 includes two negative electrode plates 231 and 232, one positive electrode plate 233 disposed between the two negative electrode plates 231 and 232, and two separators 234 and 235 respectively inserted into the positive electrode plate 233 and the two negative electrode plates 231 and 232. Since the negative electrode plates 231 and 232 have the same configuration as the negative electrode plate 131 of FIG. 2, and the positive electrode plate 233 has the same configuration as the positive electrode plate 121 of FIG. 2, their detailed descriptions will be omitted. Fine pores are formed in each of the two separators 234 and 235. Lithium ions moving between the electrode plates 231, 232, and 233 pass through the fine pores. Each of the separators 234 and 235 may be formed of a polymer resin such as PE or PP.

Although the positive electrode member 220 and the negative electrode member 230 are manufactured using three electrode plates in the embodiment of FIGS. 4A and 4B, the present disclosure is not limited thereto. For example, the positive electrode member 220 and the negative electrode member 230 may be manufactured using more than three electrode plates. It may be possible to consider either a structure in which electrode plates having polarities different from each other are alternately disposed, or a structure in which both surfaces of the electrode plate have the same polarity.

Figure 5:
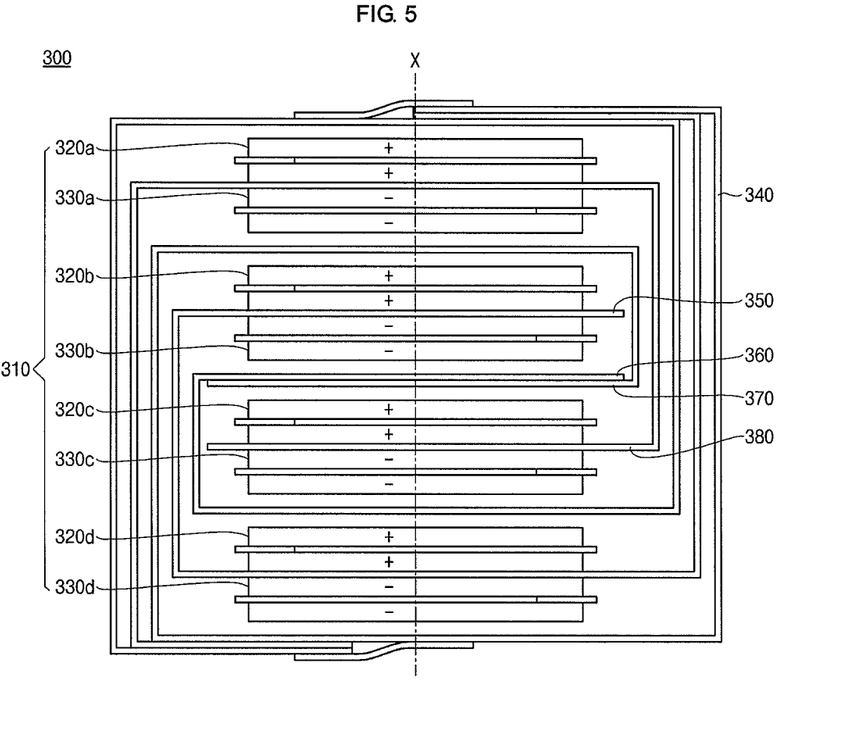
FIG. 5 illustrates an electrode assembly of a secondary battery according to another embodiment.

FIG. 5 illustrates a diagram of an electrode assembly 300 of a secondary battery according to another embodiment. Referring to FIG. 5, the electrode assembly 300 includes a plurality of electrode members 310 and an electrode member separation unit 340.

The plurality of electrode members 310 are arranged along an arrangement baseline X in a stacked shape. Two electrode members 310 adjacent to each other are separated from each other by the electrode member separation unit 340. The plurality of electrode members 310 are arranged such that positive electrode members 320a, 320b, 320c, and 320d and negative electrode members 330a, 330b, 330c, and 330d are alternately stacked. Since other constitutions are equal to those of the electrode member 110 of FIG. 2, their detailed descriptions will be omitted.

The electrode member separation unit 340 includes a first separator 350, a second separator 360, a third separator 370, and a fourth separator 380, which have the same winding center. The second separator 360 and the third separator 370 are adjacent to a winding center portion. Since other constitutions are equal to those of the electrode member separation unit 140 of FIG. 2, their detailed descriptions will be omitted.

Figure 6:
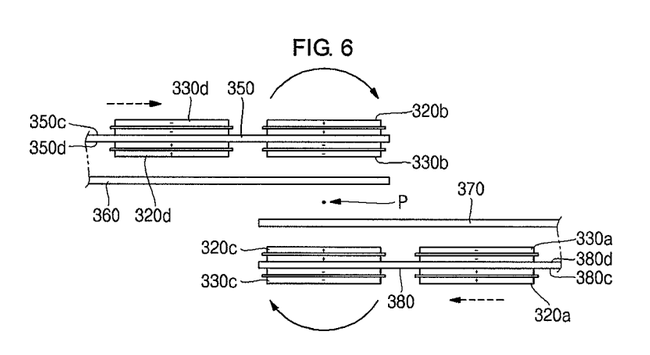
FIG. 6 illustrates a process of manufacturing the electrode assembly of FIG. 5.

FIG. 6 illustrates a view of a process of manufacturing the electrode assembly of FIG. 5. Referring to FIG. 6, a first separator 350, a second separator 360, a third separator 370, and a fourth separator 380 are disposed toward a winding center P to perform a winding process.

A positive electrode member 320b and a negative electrode member 330d are alternately disposed on an outer surface 350c of the first separator 350 in a direction away from the winding center P. A negative electrode member 330b and a positive electrode member 320d are alternately disposed on an inner surface 350d of the first separator 350 in a direction away from the winding center P.

No electrode member is disposed on the second separator 360 and the third separator 370. The second separator 360 and the third separator 370 are closely disposed to the winding center P.

A negative electrode member 330c and a positive electrode member 320a are alternately disposed on an outer surface 380c of the fourth separator 380 in a direction away from the winding center P. A positive electrode member 320c and a negative electrode member 330a are alternately disposed on an inner surface 380d of the fourth separator 380 in a direction away from the winding center P.

Since other manufacturing processes are equal to those described in the embodiment of FIG. 3, their detailed descriptions will be omitted. According to the embodiment of FIGS. 5 and 6, it is advantageous that the electrode members not to be disposed on the second separator 360 and the third separator 370.

Figure 7:
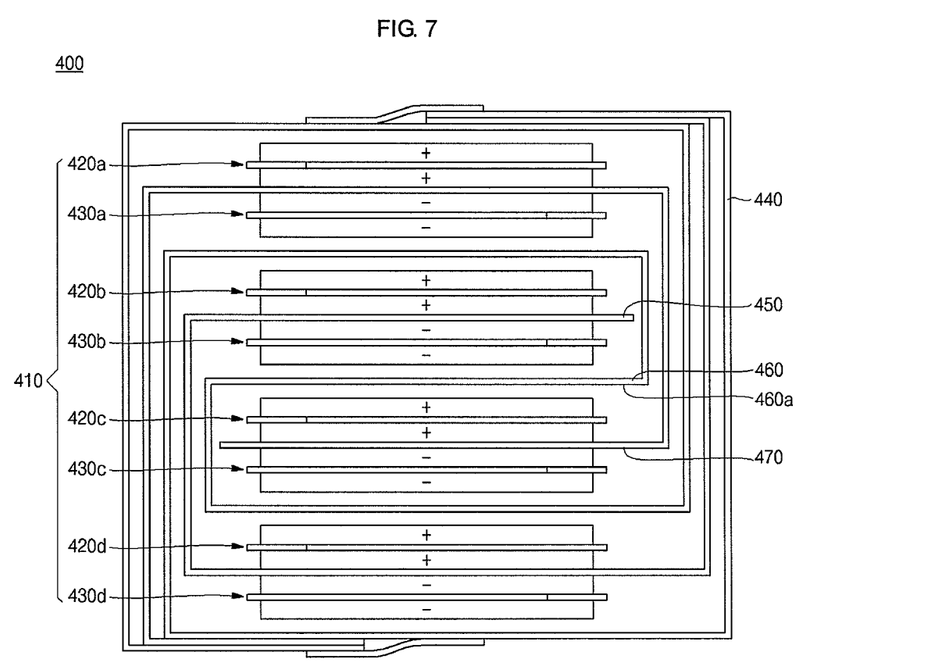
FIG. 7 illustrates an electrode assembly of a secondary battery according to another embodiment.

FIG. 7 illustrates a diagram of an electrode assembly 400 of a secondary battery according to another embodiment. Referring to FIG. 7, the electrode assembly 400 includes a plurality of electrode members 410 and an electrode member separation unit 440.

Since constitutions with respect to the plurality of electrode members are equal to those of the plurality of electrode members 310 of FIG. 5, their detailed descriptions will be omitted.

The electrode member separation unit 440 includes a first separator 450, a second separator 460, and a third separator 470, which have the same winding center. Since the first separator 450 and the third separator 470 have the same constitution as of the first separator 350 and the fourth separator 380 of FIG. 5, their detailed descriptions will be omitted. The second separator 460 has a structure in which the second separator 360 and the third separator 370 of FIG. 5 are manufactured as one separator. A middle portion 460a of the second separator 460 is disposed at a winding center portion. Since the constitutions of the other elements are equal to those of the electrode member separation unit 140, their detailed descriptions will be omitted.

Figure 8:
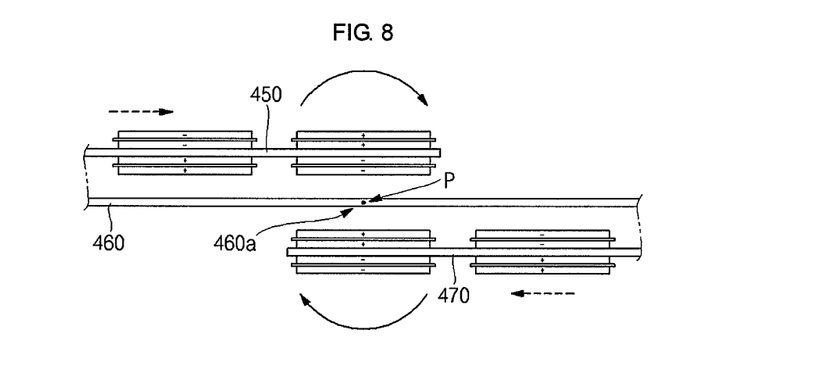
FIG. 8 illustrates a process of manufacturing the electrode assembly of FIG. 7.

FIG. 8 illustrates a view of a process of manufacturing the electrode assembly of FIG. 7. Referring to FIG. 8, the first separator 450 and the third separator 470 are symmetrically disposed with a winding center P therebetween. The middle portion 460a of the second separator 460 is disposed at a winding center P. Since other manufacturing processes are equal to those described in the embodiment of FIG. 6, their detailed descriptions will be omitted. According to the embodiments of FIGS. 7 and 8, the number of the separator is reduced by one when compared to the previously described embodiments.

Figure 9:
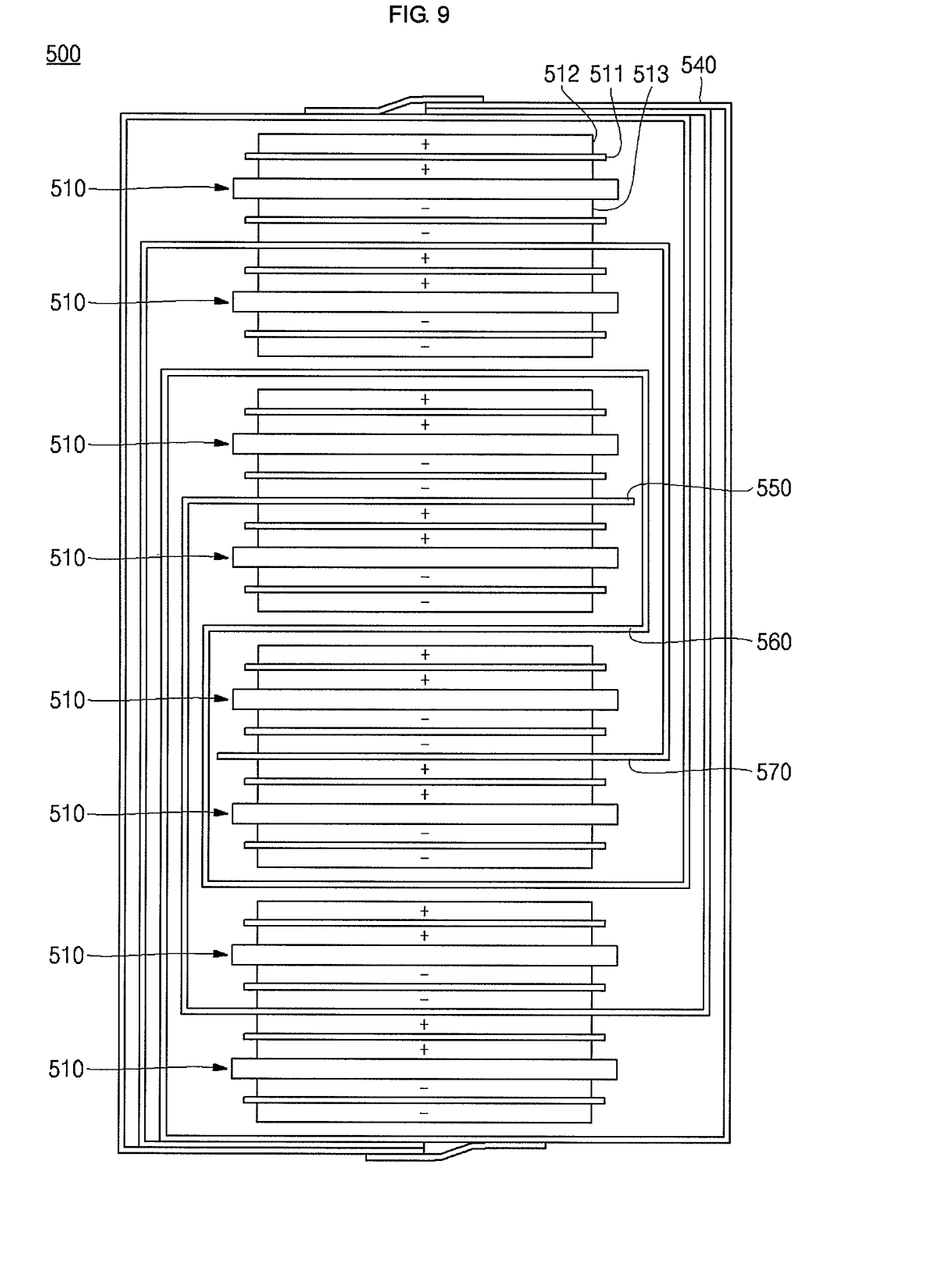
FIG. 9 illustrates an electrode assembly according to another embodiment.

FIG. 9 illustrates a diagram of an electrode assembly 500 according to another embodiment. Referring to FIG. 9, the electrode assembly 500 includes a plurality of electrode members 510 and an electrode member separation unit 540.

Since the electrode member separation unit 540 has the same constitution as the electrode member separation unit 440 of FIG. 7, their detailed descriptions will be omitted.

Each of the electrode members 510 includes a separator 511 and positive and negative electrode plates 512 and 513 disposed with the separator 511 therebetween.

Fine pores are formed in each separator 511, and lithium ions moving between the electrode plates 512 and 513 pass through the fine pores. The separator 511 may be formed of a polymer resin such as PE or PP. Since the positive electrode plate 512 has the same constitution as the positive electrode plate 121 described in the embodiment of FIG. 2, and the negative electrode plate 513 has the same constitution as the negative electrode plate 131 described in the embodiment of FIG. 2, their detailed descriptions will be omitted. In the electrode member 510, the electrode plates having polarities different from each other are disposed facing each other with a first separator 550, a second separator 560, or a third separator 570 therebetween. According to the embodiment of FIG. 9, the electrode assembly 500 may be manufactured as one unit electrode.

According to the above-described constitutions, the previously described features and advantages may be achieved. According to the embodiments, the winding number of the electrode assembly may be reduced since the electrode members are disposed on both surfaces of the separators, and furthermore, the electrode members may be precisely aligned with each other.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. An electrode assembly for a secondary battery comprising:
    a plurality of electrode members arranged in a stacked shape along an imaginary baseline extending in one direction; and
    three or more separators, each separator being interposed between and separating adjacent electrode members of opposite polarities of the plurality of electrode members,
    wherein the three or more separators are wound together about a winding center such that at least three of the three or more separators are folded together, each folded separator comprising two folded sections opposing each other, wherein a portion of at least one of the three or more separators is inserted and interposed between the two folded sections of one of the folded separators.

2. The electrode assembly as claimed in claim 1, wherein the three or more separators comprise first, second, third, and fourth separators sequentially disposed along the baseline at about the winding center, wherein one end of each of the four separators is disposed in a central portion of the electrode assembly.

3. The electrode assembly as claimed in claim 2, wherein each of the first, second, third, and fourth separators comprises an inner end and an outer end, the inner end being closer to the winding center than the outer end, wherein the inner ends of the first and second separators and the inner ends of the third and fourth separators are disposed in opposite sides of the baseline.

4. The electrode assembly as claimed in claim 3, wherein each of the four separators comprises two opposite surfaces, wherein for the first and fourth separators, at least one of the plurality of electrode members is formed on each of the two opposite surfaces thereof, whereas for the third separator, at least one of the plurality of electrode members is formed only one of the two opposite surfaces thereof.

5. The electrode assembly as claimed in claim 3, wherein the second separator and the third separator contact each other in the central portion of the electrode assembly.

6. The electrode assembly as claimed in claim 1, wherein the three or more separators comprise first, second, and third separators sequentially disposed along the baseline, wherein an end of the first separator and an end of the third separator are disposed in opposite sides of the baseline, and the second separator is wound to surround the end of the first separator and the end of the third separator.

7. The electrode assembly as claimed in claim 1, wherein each of the plurality of electrode members comprises a positive electrode member or a negative electrode member, the positive electrode member comprising a positive electrode current collector and a positive electrode active material layer formed on the positive electrode current collector, and the negative electrode member comprising a negative electrode current collector and a negative electrode active material layer formed on the negative electrode current collector.

8. A secondary battery comprising:
    the electrode assembly of claim 1; and
    an exterior case in which the electrode assembly is disposed.

9. The secondary battery as claimed in claim 8, wherein the three or more separators comprise first, second, third, and fourth separators sequentially disposed along the baseline at about the winding center, wherein one end of each of the four separators is disposed in a central portion of the electrode assembly.

10. The secondary battery as claimed in claim 9, wherein each of the first, second, third, and fourth separators comprises an inner end and an outer end, the inner end being closer to the winding center than the outer end, wherein the inner ends of the first and second separators and the inner ends of the third and fourth separators are disposed in opposite sides of the baseline.

11. The secondary battery as claimed in claim 10, wherein each of the four separators comprises two opposite surfaces, wherein at least one of the plurality of electrode members is formed on each of the two opposite surfaces of the first separator, wherein at least one of the plurality of electrode members is formed on each of the two opposite surfaces of the fourth separator, wherein at least one of the plurality of electrode members is disposed on only one of the two opposite surfaces of the third separator.

12. The secondary battery as claimed in claim 10, wherein the second separator and the third separator contact each other in the central portion of the electrode assembly.

13. The secondary battery as claimed in claim 8, wherein the three or more separators comprise first, second, and third separators sequentially disposed along the baseline, wherein an end of the first separator and an end of the third separator are disposed in opposite sides of the baseline, and the second separator is wound to surround the end of the first separator and the end of the third separator.

14. The secondary battery as claimed in claim 9, wherein each of the plurality of electrode members comprises a positive electrode member or a negative electrode member.

15. A method of manufacturing an electrode assembly for a secondary battery, the method comprising:
    providing first, second, third, and fourth separators, at least one electrode member formed on two opposite surfaces of the first separator, at least one electrode member formed on two opposite surfaces of the fourth separator;

sequentially stacking an end of each of the first, second, third, and fourth separators;

rolling the first, second, third, and fourth separators to wind the separators together about a winding center; and wherein the ends of the first and second separators face generally in one direction and the ends of the third and fourth separators face generally in an opposite direction.

16. The method as claimed in claim 15, wherein providing the first and fourth separators comprises placing at least one positive electrode plate on one of the two opposite surfaces thereof and further placing at least one negative electrode place on the other of the two opposite surfaces, wherein providing the second and third separators comprises placing at least one positive or negative electrode plate only on one of two opposite surfaces thereof.

17. The method as claimed in claim 15, wherein providing the first and fourth separators comprises alternatingly placing electrode plates having different polarities on one of the two opposite surfaces thereof.

18. A method of manufacturing an electrode assembly for a secondary battery, the method comprising:

providing first, second, and third separators, at least one electrode member formed on two opposite surfaces of the first separator, at least one electrode member formed on two opposite surfaces of the third separator;

sequentially stacking the first, second, and third separators, wherein an end portion of the first separator, a middle portion of the second separator and an end portion of the third separator are stacked;

rolling the end portions of the first and third separators and the middle portion of the second separator to wind the separators together about a winding center; and wherein the end portion of the first separator and the end portion of the third separator face generally opposite directions.

19. The method as claimed in claim 18, wherein providing the first and third separators comprises alternatingly placing electrode plates having different polarities on one of the two opposite surfaces thereof.

20. The electrode assembly as claimed in claim 1, wherein the three or more separators comprises a first separator and a second separator, wherein the three or more separators are wound together such that an inner-most portion of the first separator is interposed between a wound portion of the second separator while an inner-most portion of the second separator is interposed between a wound portion of the first separator.

* * * * *